(12) United States Patent
Kim et al.

(10) Patent No.: US 9,190,103 B2
(45) Date of Patent: Nov. 17, 2015

(54) DATA STORAGE MEDIUM HAVING SECURITY FUNCTION AND OUTPUT APPARATUS THEREFOR

(75) Inventors: Chang-Jung Kim, Yongin-si (KR);
In-Kyeong Yoo, Yongin-si (KR);
Ho-Jung Kim, Suwon-si (KR);
Chul-Woo Park, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 285 days.

(21) Appl. No.: 13/503,511

(22) PCT Filed: Oct. 21, 2010

(86) PCT No.: PCT/KR2010/007253
§ 371 (c)(1),
(2), (4) Date: Apr. 23, 2012

(87) PCT Pub. No.: WO2011/049393
PCT Pub. Date: Apr. 28, 2011

(65) Prior Publication Data
US 2012/0210054 A1    Aug. 16, 2012

(30) Foreign Application Priority Data
Oct. 21, 2009 (KR) .................. 10 2009 0100469

(51) Int. Cl.
| | |
|---|---|
| *G06F 12/00* | (2006.01) |
| *G11B 20/00* | (2006.01) |
| *G06F 21/10* | (2013.01) |
| *G06F 21/79* | (2013.01) |
| *G11C 7/24* | (2006.01) |
| *G06F 12/02* | (2006.01) |

(52) U.S. Cl.
CPC .......... *G11B 20/00086* (2013.01); *G06F 21/10* (2013.01); *G06F 21/79* (2013.01); *G11C 7/24* (2013.01); *G06F 12/0246* (2013.01); *G11B 2220/60* (2013.01)

(58) Field of Classification Search
CPC .................. G06F 12/0238; G06F 12/0246
See application file for complete search history.

(56) References Cited

U.S. PATENT DOCUMENTS

| | | | |
|---|---|---|---|
| 5,781,627 | A | 7/1998 | Ikuta et al. |
| 6,226,199 | B1 | 5/2001 | Ichikawa |
| 6,510,090 | B1 | 1/2003 | Chida |

(Continued)

FOREIGN PATENT DOCUMENTS

| | | |
|---|---|---|
| CN | 1316087 A | 10/2001 |
| EP | 1050887 | 11/2000 |

(Continued)

OTHER PUBLICATIONS

International Search Report.
(Continued)

*Primary Examiner* — Brian Peugh
(74) *Attorney, Agent, or Firm* — Harness, Dickey & Pierce, P.L.C.

(57) ABSTRACT

Provided are a storage medium, which has a security function, for storing media content and an output apparatus for outputting data stored in the storage medium. The storage medium includes a controller for converting at least one of a position of pins of a connector and a storage position of media content in a memory unit in order to control transmission of the media content in the memory unit to the output apparatus.

13 Claims, 6 Drawing Sheets

(56) References Cited

U.S. PATENT DOCUMENTS

| | | |
|---|---|---|
| 6,606,707 B1 | 8/2003 | Hirota et al. |
| 7,395,165 B2 | 7/2008 | Buhr |
| 2003/0182564 A1 | 9/2003 | Lai et al. |
| 2003/0221103 A1 | 11/2003 | Hirota et al. |
| 2004/0036109 A1 | 2/2004 | Inoue et al. |
| 2005/0005149 A1 | 1/2005 | Hirota et al. |
| 2005/0008151 A1 | 1/2005 | Liang |
| 2005/0060483 A1 | 3/2005 | Azuma |
| 2006/0025952 A1 | 2/2006 | Buhr |
| 2006/0129819 A1 | 6/2006 | Hirota et al. |
| 2008/0115210 A1 | 5/2008 | Hirota et al. |
| 2010/0211992 A1 | 8/2010 | Cho et al. |
| 2012/0117663 A1 | 5/2012 | Hirota et al. |

FOREIGN PATENT DOCUMENTS

| | | |
|---|---|---|
| EP | 1304702 A1 | 4/2003 |
| JP | 06-202686 | 7/1994 |
| JP | 2000-214970 A | 8/2000 |
| JP | 2000-215108 | 8/2000 |
| JP | 2001-014441 | 1/2001 |
| JP | 2002-091828 | 3/2002 |
| JP | 2005-78494 A | 3/2005 |
| JP | 2006-208866 A | 8/2006 |
| JP | 2007-220211 A | 8/2007 |
| JP | 2009-224769 A | 10/2009 |
| KR | 1997-0010526 | 6/1997 |
| KR | 970010526 B1 | 6/1997 |
| KR | 2002-0063679 A | 8/2002 |
| KR | 2002-0085753 A | 11/2002 |
| KR | 2005-0116091 A | 12/2005 |
| KR | 2006-0043953 A | 5/2006 |
| KR | 2009-0028122 A | 3/2009 |

OTHER PUBLICATIONS

Japanese Office Action dated Oct. 1, 2013 issued in corresdponding Japanese Application No. 2012-535133.
European Search Report dated Nov. 12, 2013 issued in corresponding European Application No. 10825218.0.
Chinese Office Action dated Apr. 2, 2014 in corresponding application No. 201080058615.X
Japanese Office Action issued on Aug. 19, 2014 for JP Application No. 2012-535133.

DATA STORAGE MEDIUM HAVING SECURITY FUNCTION AND OUTPUT APPARATUS THEREFOR

BACKGROUND OF THE INVENTION

1. Field of the Invention

The present invention generally relates to a storage medium for storing media contents and an output apparatus for outputting data stored in the storage medium.

2. Description of the Related Art

Recently, publications, such as textbooks, home-study materials, dictionaries, and novels, have been provided through not only paper books but also electronic storage media. That is, a user may read or see details of a publication through a portable display device by storing publication data in an electronic storage medium, e.g., a memory card, and then displaying the publication data stored in the memory card through the portable display device.

Meanwhile, much of publication data stored in electronic storage media are necessary to be protected by copyright. However, illegal copy or hacking is easily performed in an actual life, so copyright protection of the publication data stored in the electronic storage media is insufficient. Such copyright protection is desperately required for entire media contents including the publication data, image data, and audio data.

SUMMARY OF THE INVENTION

The present invention provides a storage medium having a security function while storing media content, such as publication data, image data, or audio data, and an output apparatus for outputting data stored in the storage medium.

According to an aspect of the present invention, there is provided a data storage medium including: a memory unit for storing media content; a connector for being electrically connected to an output apparatus for outputting the media content; and a controller for converting at least one of a position of pins of the connector and a storage position of the media content in order to control transmission of the media content stored in the memory unit to the output apparatus.

The controller may control the transmission of the media content stored in the memory unit if authentication of the output apparatus succeeds.

The memory unit may store at least one unique number of the output apparatus, and the controller may perform authentication of the output apparatus by comparing a unique number provided by the output apparatus with the stored unique number.

The memory unit may include at least one One-Time Programmable (OTP) memory capable of storing data only once.

The memory unit may include at least one One Diode One Register (1D1R) memory.

The controller may include: a memory controller for generating an enable signal if the output apparatus is authenticated after authentication of the output apparatus is performed by comparing a unique number provided by the output apparatus with a unique number stored in the memory unit; and a security controller, which is operated by the enable signal and provides a security function for the media content stored in the memory unit by converting at least one of the position of the pins of the connector and the storage position of the media content.

The position of the pins of the connector and the storage position of the media content in the memory unit may be converted by key data generated using the unique number stored in the memory unit.

The memory controller may control not to perform additional writing/reading in an area in which the at least one unique number of the output apparatus is stored in the memory unit.

According to another aspect of the present invention, there is provided an output apparatus including: at least one panel; an insertion unit, which is prepared in the panel and into which a data storage medium is inserted; and at least one display unit, which is prepared in the panel and outputs data stored in the data storage medium to the outside.

The panel may further include a speaker and an earphone insertion hole for outputting sound.

The insertion unit may be prepared on the surface or the side of the panel and include a plurality of pins for electrical connection to the data storage medium.

The panel may further include a communication port for communication with an external device.

According to the present invention, copy without permission or hacking of data stored in a storage medium may be prevented more reliably by storing media content, such as publication data, image data, or audio data, in an OTP memory capable of storing data only once and preparing a controller having a security function therein, thereby sufficiently protecting copyright of stored data while minimizing addition of hardware.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention should, however, not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted. In the drawings, the thicknesses of layers and regions are exaggerated for clarity.

Figure 1:
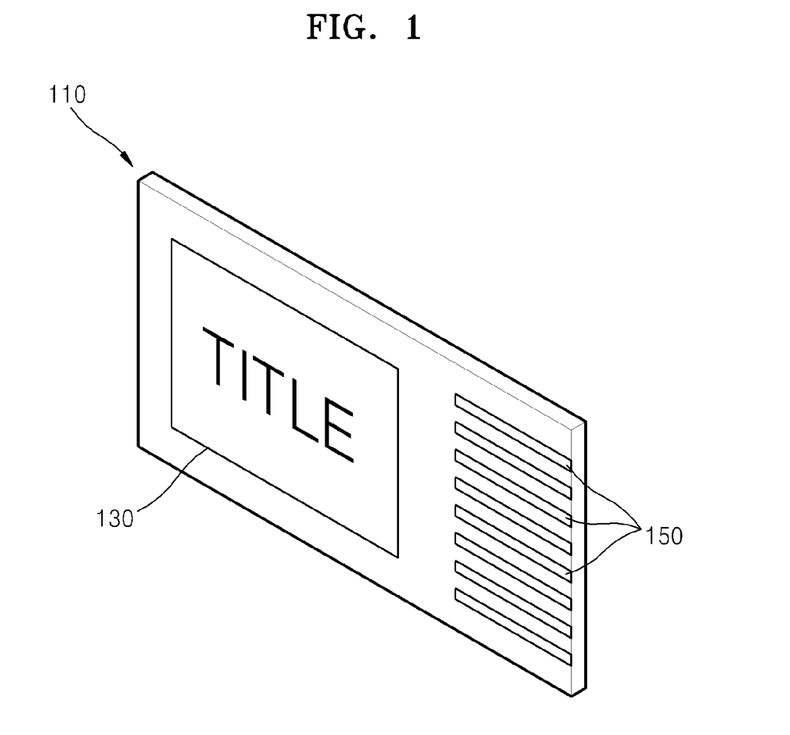
FIG. 1 is a perspective view of a data storage medium according to an exemplary embodiment of the present invention.

FIG. 1 is a perspective view of a data storage medium according to an exemplary embodiment of the present invention.

Referring to FIG. 1, an electronic data storage medium 110 is to store publication data, such as textbooks, home-study materials, dictionaries, and novels, image data, such as movies, or audio data, such as music, for which copyright protection is necessary. The electronic data storage medium 110 (hereinafter, storage medium 110) may be connected to an output apparatus 520 (of FIG. 5), thereby outputting media content, such as the publication data, the image data, or the audio data, stored in the storage medium 110 to the outside so that a user may read, see, or listen to the media content through a display unit 517 (of FIG. 5) or a speaker 511 (of FIG. 5) of the output apparatus 520.

The storage medium 110 may have a card shape and may further include a title display unit 130 on the surface thereof to identify details of the stored publication data and/or image data and/or audio data.

The storage medium 110 may be electrically connected to the output apparatus 520 and may further include a plurality of pins 150 exposed on the surface thereof. Although it is shown that the plurality of pins 150 are exposed on the front of the storage medium 110, the plurality of pins 150 may be exposed on the rear of the storage medium 110. Here, the plurality of pins 150 may include the concept of contact.

The storage medium 110 may contact various portable devices, such as an e-book, a mobile phone, a Moving Pictures Experts Group-1 Audio Layer 3 (MP3) player, a Portable Media Player (PMP), a navigation, and a Solid State Drive (SSD), in a removable way or may be inserted into them through a slot.

Figure 2:
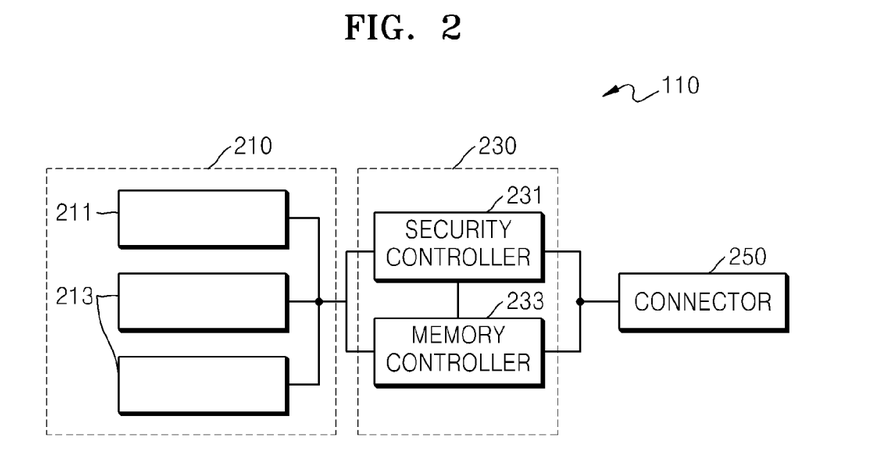
FIG. 2 is a block diagram of the storage medium shown in FIG. 1.

FIG. 2 is a block diagram of the storage medium shown in FIG. 1.

Referring to FIG. 2, the storage medium 110 may include a memory unit 210 for storing at least one unique number of the output apparatus 500 and data, such as media content, a controller 230, and a connector 250 for contacting the output apparatus 500.

The memory unit 210 may be achieved with at least one One-Time Programmable (OTP) memory 213 capable of storing data only once, in which publication data, image data, and/or audio data is stored. The memory unit 210 stores at least one unique number of the output apparatus 500 in a separate area of the OTP memory 213 or an additional OTP memory 211. The separate area of the OTP memory 213 or the additional OTP memory 211 in which the at least one unique number of the output apparatus 500 is stored may be controlled so that writing or reading from the outside is impossible. The memory unit 210 may be implemented with a flash memory or a One Diode One Register (1D1R) memory but is not necessarily limited to this. When the 1D1R memory is used, an occupied area may be minimized, a logic process may be simple, and excellent compatibility may be obtained.

The controller 230 converts at least one of a position of pins of the connector 250 through which media content read from the memory unit 210 is output and a storage position of the media content in the memory unit 210 in order to control transmission of the media content stored in the memory unit 210 to the output apparatus 500. The controller 230 may include a security controller 231 and a memory controller 233. The memory controller 233 performs authentication of the output apparatus 500 by comparing a unique number provided by the output apparatus 500 with a unique number stored in the memory unit 210 and generates an enable signal if the output apparatus 500 is authenticated. The security controller 231 is operated by the enable signal generated by the memory controller 233 and provides a security function for the media content stored in the memory unit 210 by converting at least one of the position of the pins of the connector 250 and the storage position of the media content in the memory unit 210.

In detail, when the storage medium 110 is connected to the output apparatus 500 or is in a power-up state by a power button being turned on after the connection, the memory controller 233 receives a unique number allocated to the output apparatus 500 from the output apparatus 500 and reads a unique number from the memory unit 210. The memory controller 233 compares the received unique number with the read unique number, and if the received unique number is identical to the read unique number, it means that the output apparatus 500 is authenticated to be able to access the storage medium 110. That is, if the output apparatus 500 is authenticated, the security controller 231 is enabled to read media content from the storage medium 110 to the output apparatus 500. On the other hand, the memory controller 233 compares the received unique number with the read unique number, and if the received unique number is not identical to the read unique number, it means that the output apparatus 500 is not authenticated to be able to access the storage medium 110. That is, if the output apparatus 500 is not authenticated, the connector 250 is disabled to prevent media content from being read from the storage medium 110 to the output apparatus 500. The storage medium 110 may output media content to at least more than one output apparatus by storing at least more than one unique number.

Meanwhile, if the output apparatus 500 is authenticated, the memory controller 233 controls to receive a signal from the output apparatus 510 and transmit data stored in the memory unit 210 to the output apparatus 500 in response to the received signal. The data transmitted from the storage medium 110 to the output apparatus 500 may be displayed or output through the display unit 517 or the speaker 511 of the output apparatus 500.

The connector 250 is for the storage medium 110 to be electrically connected to the output apparatus 500 and may be implemented with the plurality of pins 150.

As described above, the storage medium 110 may more reliably prevent copy without permission or hacking of data stored therein by including the OTP memory 213 in which media content, such as publication data, image data, and/or audio data, may be stored only once and the controller 230 having a security function therein.

In addition, the storage medium 110 may more sufficiently perform copyright protection of data stored therein by performing authentication of the output apparatus 500 in the memory controller 233 and allowing only the authenticated output apparatus 500 to access media content from the memory unit 210.

Figure 3:
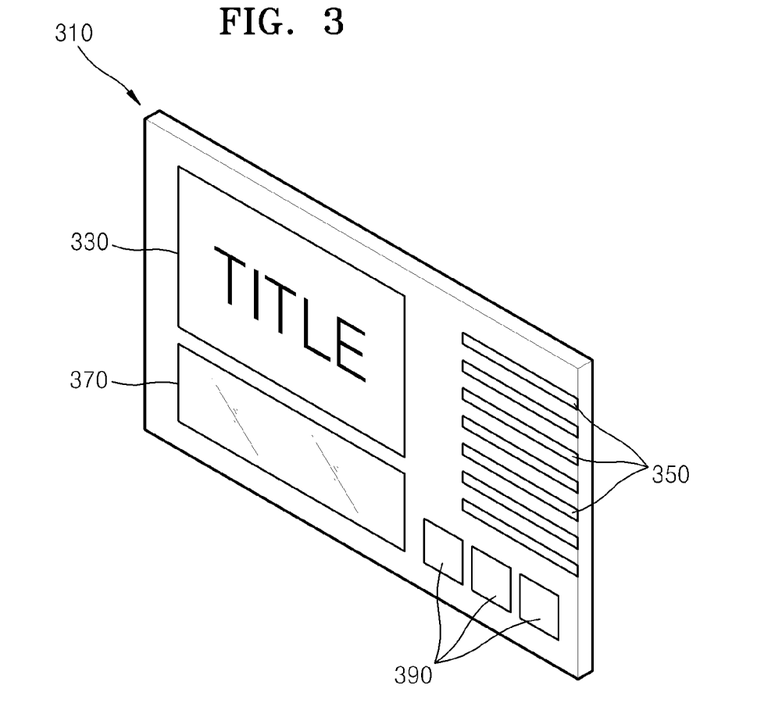
FIG. 3 is a perspective view of a data storage medium according to another exemplary embodiment of the present invention.

FIG. 3 is a perspective view of a data storage medium according to another exemplary embodiment of the present invention.

Referring to FIG. 3, a storage medium 310 includes a title display unit 330 and a plurality of pins 350 as in FIG. 1 and may further include a small-sized display unit 370. The small-sized display unit 370 is to show a part of media content stored in a memory unit (410 of FIG. 4), e.g., a feature or synopsis of a publication, a movie trailer, or lyrics of music, by being installed on the surface of the storage medium 310 and plays a role to help a user select the storage medium 310.

Operational buttons 390 for operating the small-sized display unit 370 may be further included in the surface of the storage medium 310 together with the small-sized display unit 370.

Figure 4:
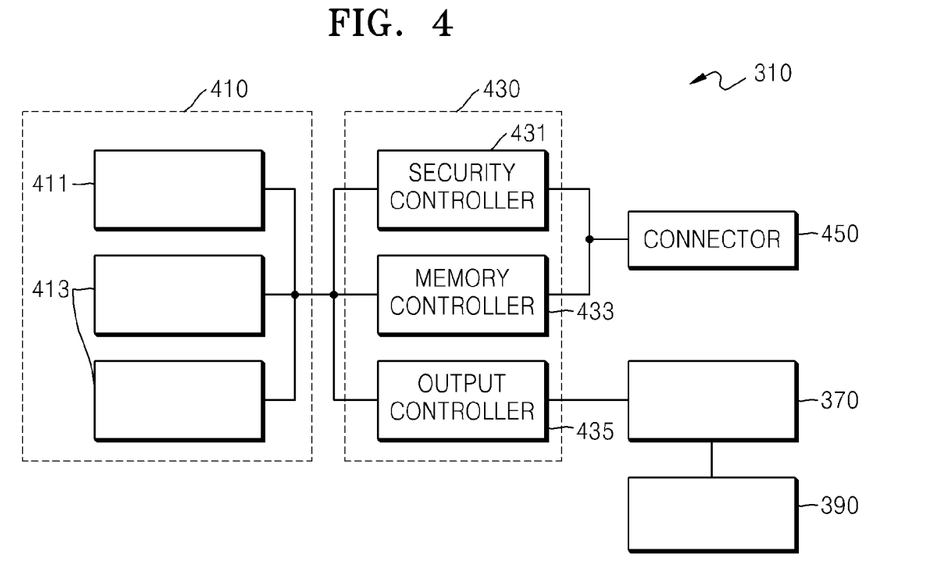
FIG. 4 is a block diagram of the storage medium shown in FIG. 3.

FIG. 4 is a block diagram of the storage medium 310 shown in FIG. 3.

Referring to FIG. 4, the storage medium 310 includes a memory unit 410, a controller 430, and a connector 450 as in FIG. 2, and the controller 430 may further include an output controller 435 for controlling an operation of the small-sized display unit 370. In addition, the storage medium 310 may further include a small-sized battery 395 as a power source for the small-sized display unit 370. Here, the memory unit 410, a security controller 431 and a memory controller 433 of the controller 430, and the connector 450 shown in FIG. 4 are identical to those shown in FIG. 2, so detailed description thereof is omitted.

Figure 5:
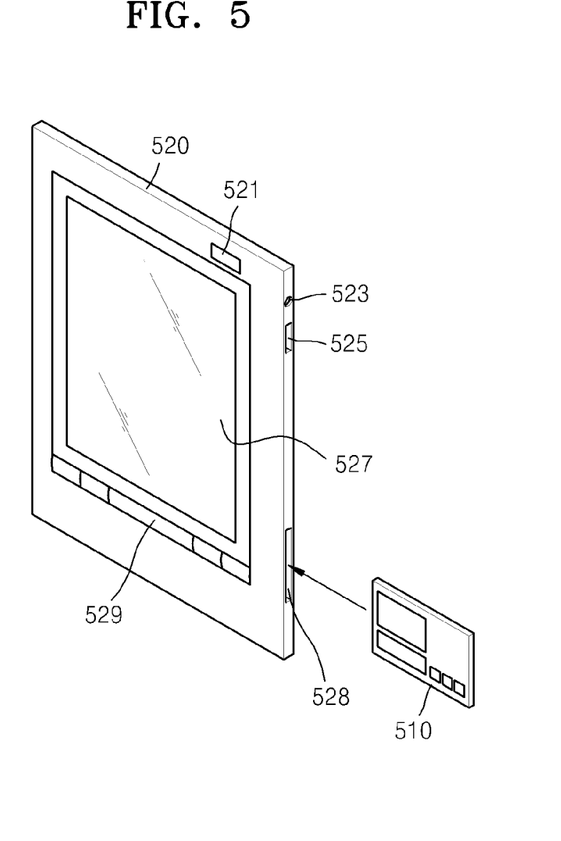
FIG. 5 is a perspective view of an output apparatus for displaying data stored in the storage medium shown in FIG. 1 or 3 to the outside.

FIG. 5 is a perspective view of an output apparatus for outputting data stored in the storage medium shown in FIG. 1 or 3 to the outside.

Referring to FIG. 5, the output apparatus 500 includes at least one panel 520 and may include a plurality of panels opening and closing with a hinge linkage. The panel 520 includes at least one display unit 527 and may further include operational buttons 529 for operating the display unit 527.

An insertion unit 528 into which a storage medium 510 is inserted may be included in the surface of the panel 520, and a plurality of pins 222 may be included in the insertion unit 528. When the storage medium 510 is inserted into the insertion unit 528, the pins 222 of the insertion unit 528 contact pins of the storage medium 510 so that the storage medium 510 is electrically connected to the output apparatus 500. On the other hand, the insertion unit 528 into which the storage medium 510 is inserted may be included in the side of the panel 520. Here, the insertion unit 528 may be a slot type in a case of a card-shaped storage medium 510 or a removable type in a case of a typical memory type.

The panel 520 may further include a speaker 521, an earphone insertion hole 523, and a communication port 525. The output apparatus 500 may have a reading function of reading text data corresponding to publication data, and in this case, the speaker 521 and the earphone insertion hole 523 may be used. In addition, the speaker 521 and the earphone insertion hole 523 may also be used for outputting sound when enjoying movie or music through the output apparatus 500. The communication port 525 may be used when performing wired or wireless communication with an external device.

Although not shown, the panel 520 may include therein a controller for controlling the output apparatus 500 and a battery block as a power source for operating the output apparatus 500. A memory unit included in the panel 520 may be achieved with a plurality of Many-Times Programmable (MTP) memory chips capable of repeatedly storing data many times. The panel 520 may further include an insertion unit into which a memory is inserted so that an external memory may be additionally used.

Figure 6:
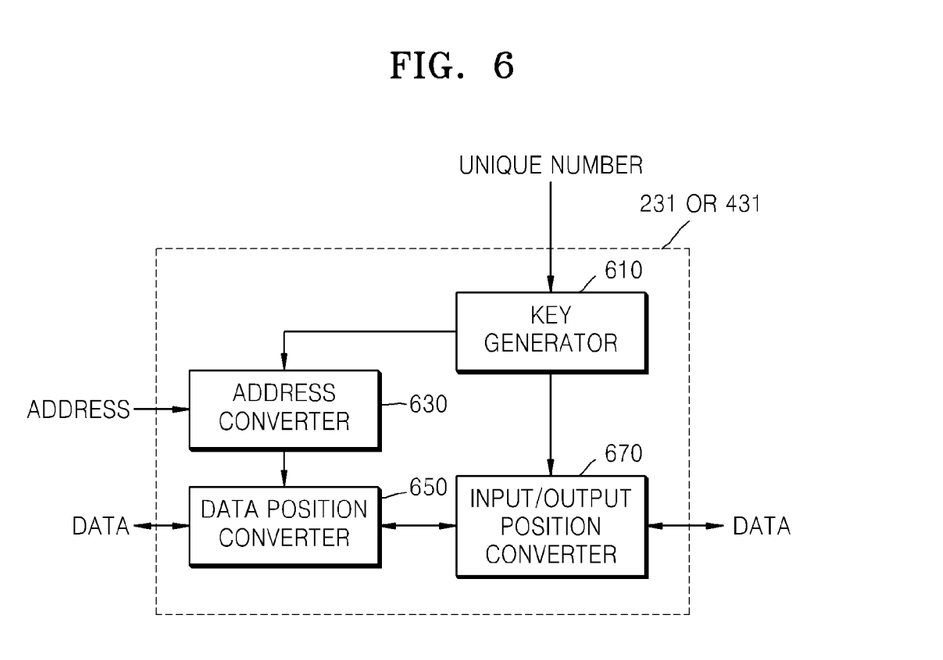
FIG. 6 is a block diagram of a security controller shown in FIG. 2 or 4.

FIG. 6 is a block diagram of the security controller 231 or 431 shown in FIG. 2 or 4.

Referring to FIG. 6, the security controller 231 or 431 may include a key generator 610, an address converter 630, a data position converter 650, and an input/output position converter 670. In more detail, the key generator 610 generates key data using a unique number stored in the memory unit 210 or 410. Here, the key data using the unique number may be generated using a Hash function. A function used in the key data generation is not necessarily limited to the Hash function, and various encryption functions may be applied to the function used in the key data generation. Meanwhile, the generated key data is not fixed but periodically updated, thereby providing a security function of a higher level.

The address converter 630 converts a reading address or a writing address provided by the memory controller 233 or 433 by using the key data generated by the key generator 610. The address conversion using arbitrary data may be performed by means of various well-known methods.

The data position converter 650 performs conversion of a reading or writing data position by reading data of a position corresponding to the reading address converted by the address converter 630 from the memory unit 210 or 410 and providing the read data to the input/output position converter 670 or writing data received through the input/output position converter 670 in a position corresponding to the converted writing address. Here, the data position converter 650 may be implemented with, for example, an eight-word, i.e., 64-bit, register. In more detail, the data position converter 650 may read data of a position corresponding to the reading address converted, that is, encrypted by the address converter 630 from the memory unit 210 or 410. Then, the data position converter 650 may inversely convert, that is, decrypt the encrypted reading address of the read data by using the key data. That is, encryption and decryption functions may be achieved by converting a reading or writing data position from the memory unit 210 or 410 by means of the key data.

The input/output position converter 670 converts positions of input/output pins of the connector 250 or 450 by using the key data generated by the key generator 610. Here, the input/output position converter 670 may further include a decoding register for decoding the key data provided from the key generator 610. That is, encryption and decryption functions may be achieved by converting the positions of input/output pins by means of the key data.

In order to provide a differentiated security function of a storage medium, it is also possible that at least one of the data position converter 650 and the input/output position converter 670 is included.

Figure 7:
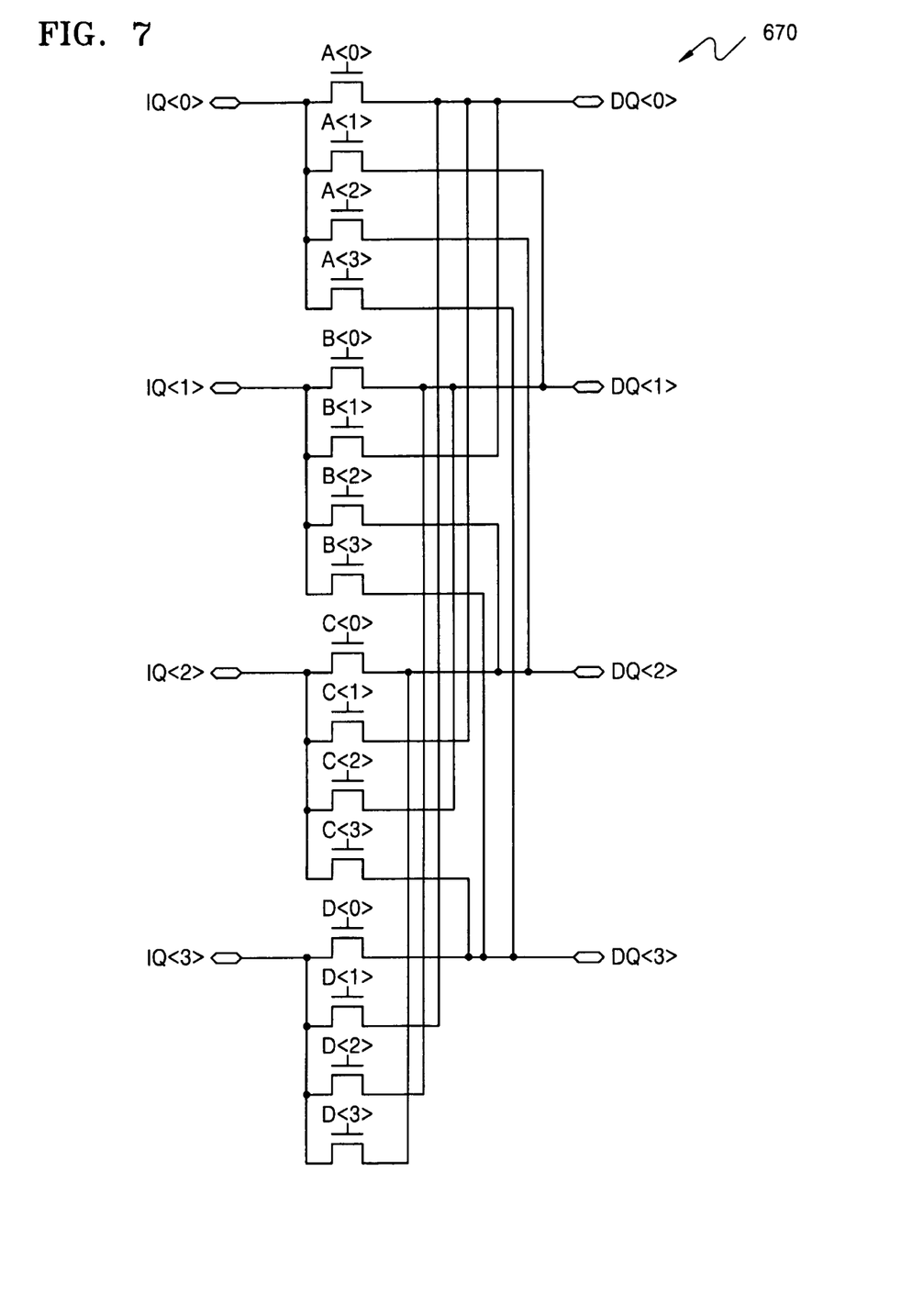
FIG. 7 is a diagram illustrating an example of an input/output position converter shown in FIG. 6.

FIG. 7 is a diagram illustrating an example of the input/output position converter 670 shown in FIG. 6. Referring to FIG. 7, the key generator 610 of FIG. 6 my generate key data, such as A<0:3>, B<0:3>, C<0:3>, and D<0:3>, by using a unique number stored in the memory unit 210 or 410, and the input/output position converter 670 may convert paths through which a signal is connected to the input/output pins of the connector 250 or 450 by using each key data as a control signal of a switching device.

Figure 8:
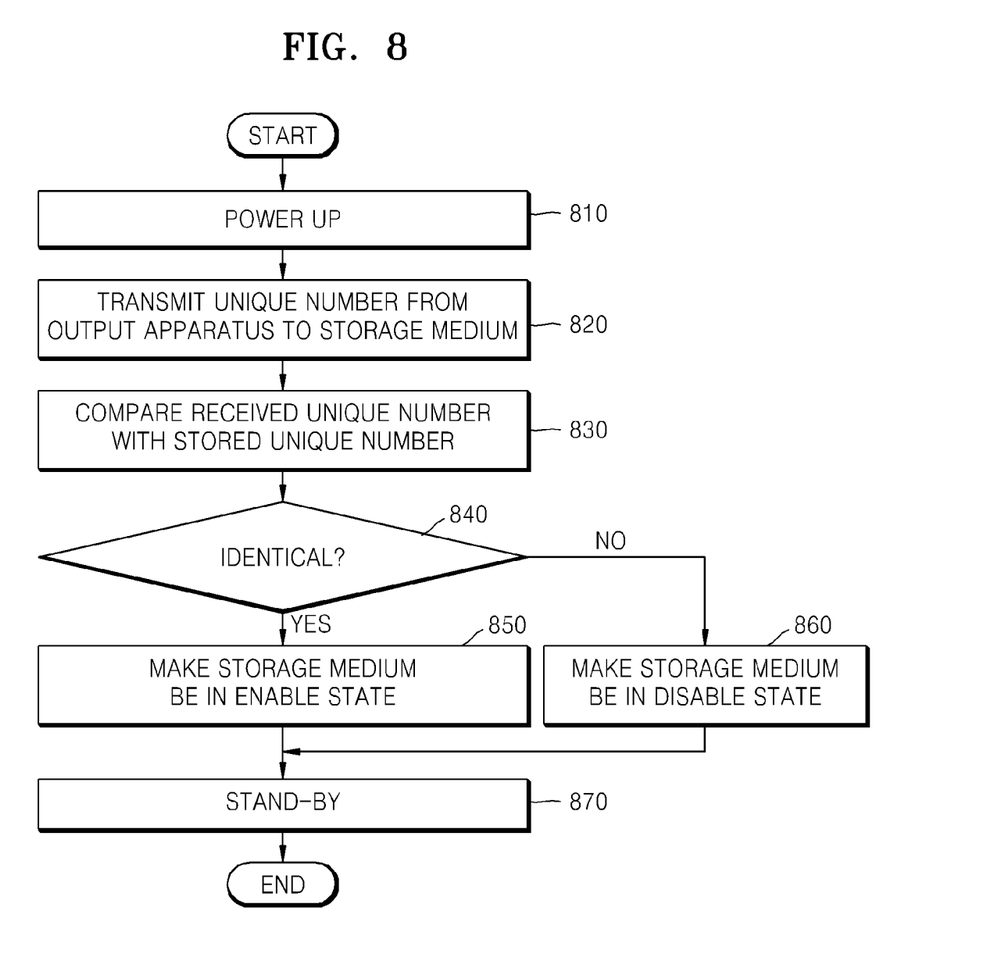
FIG. 8 is a flowchart for describing an operation of a memory controller shown in FIG. 2 or 4.

FIG. 8 is a flowchart for describing an operation of the memory controller 233 or 433 shown in FIG. 2 or 4.

Referring to FIG. 8, in operation 810, a storage medium is in a power-up state by being connected to an output apparatus. The power-up state may be achieved by the storage medium being connected to the output apparatus or by operating a separate power button after connecting the storage medium to the output apparatus.

In operation 820, a unique number is transmitted from the output apparatus to the storage medium. Here, the unique number may be a product number allocated to the output apparatus or a number indicating a product type, and is not necessarily limited to this.

In operation 830, the storage medium compares the unique number transmitted from the output apparatus with at least one unique number stored in the storage medium.

In operation 840, the storage medium determines whether the unique number transmitted from the output apparatus is identical to the at least one unique number stored in the storage medium.

In operation 850, if the unique number transmitted from the output apparatus is identical to the at least one unique number stored in the storage medium, the output apparatus is authenticated so that the output apparatus may output media content from the storage medium, so the storage medium is in an enable state. In detail, the memory controller 233 or 433 generates an enable signal and provides the enable signal to the security controller 231 or 431 of the storage medium. Accordingly, the media content stored in the storage medium is transmitted to the output apparatus with a security function.

In operation 860, if the unique number transmitted from the output apparatus is not identical to the at least one unique number stored in the storage medium, the output apparatus is not authenticated so that the output apparatus may not output media content from the storage medium, so the storage medium is in a disable state. In detail, the memory controller 233 or 433 generates a disable signal and provides the disable signal to the connector 250 or 450, thereby making all pins be in a floating state. Accordingly, transmission of the media content stored in the storage medium to an external device or reception of data from the external device is impossible.

In operation 870, the storage medium is in a stand-by state for data transmission to the output apparatus or for replacement of the storage medium or the output apparatus.

While the above description has been particularly shown in detail, it will be understood by those skilled in the art that the description should be considered as illustrations of preferred embodiments rather than for purposes of limitation of the scope of the invention. For example, it will be understood by those skilled in the art that the structures of FIGS. 1 and 3 may be variously changed in form and details and an operating method thereof may also be variously changed in form and details. Therefore, the scope of the invention is defined not by the detailed description of the invention but by the technical spirits disclosed in the appended claims.

What is claimed is:

1. A data storage medium comprising:
   a memory unit to store media content and a unique number that uniquely identifies an associated output apparatus;
   a connector including a plurality of input pins and a plurality of output pins, configured to electrically connect to the output apparatus for outputting the media content; and
   a controller including an input/output position converter configured to alter at least one of a mapping between the input pins and output pins of the connector and a storage position of the media content based on the stored unique number in order to control transmission of the media content stored in the memory unit to the output apparatus.

2. The data storage medium of claim 1, wherein the controller controls the transmission of the media content stored in the memory unit if authentication of the output apparatus succeeds.

3. The data storage medium of claim 1, wherein the controller performs authentication of the output apparatus by comparing a received unique number provided by the output apparatus with the stored unique number.

4. The data storage medium of claim 1, wherein the memory unit comprises at least one One-Time Programmable (OTP) memory capable of storing data only once.

5. The data storage medium of claim 1, wherein the memory unit comprises at least one One Diode One Register (1D1R) memory.

6. The data storage medium of claim 1, wherein the controller is configured to alter the mapping between the input pins and the output pins and the storage position of the media content in the memory unit based on key data generated using the stored unique number.

7. The data storage medium of claim 1, wherein the controller comprises:
   a memory controller to generate an enable signal if the output apparatus is authenticated after authentication of the output apparatus is performed by comparing a received unique number provided by the output apparatus with the stored unique number stored in the memory unit; and
   a security controller, which is operated by the enable signal and provides a security function for the media content stored in the memory unit by altering at least one of a mapping between the input pins and the output and the storage position of the media content.

8. The data storage medium of claim 1, wherein the the mapping between the input pins and the output pins of the connector and the storage position of the media content in the memory unit are altered based on key data generated using the stored unique number stored in the memory unit.

9. The data storage medium of claim 1, wherein the memory controller controls not to perform additional writing/reading in an area in which the at least one unique number of the output apparatus is stored in the memory unit.

10. An output apparatus comprising:
    at least one panel;
    an insertion unit, which is prepared in the panel and into which a data storage medium according to claim 1 is inserted; and
    at least one display unit, which is prepared in the panel and outputs data stored in the data storage medium to the outside.

11. The output apparatus of claim 10, wherein the panel further comprises a speaker and an earphone insertion hole for outputting sound.

12. The output apparatus of claim 10, wherein the insertion unit is prepared on the surface or the side of the panel and comprises therein a plurality of pins for electrical connection to the data storage medium.

13. The output apparatus of claim 10, wherein the panel further comprises a communication port for communication with an external device.

* * * * *